United States Patent [19]

Kashmerick

[11] Patent Number: 5,636,850
[45] Date of Patent: Jun. 10, 1997

[54] DEFORMABLE COMBUSTION SEAL RING

[75] Inventor: Jerry E. Kashmerick, Lisle, Ill.

[73] Assignee: Dana Corporation, Toledo, Ohio

[21] Appl. No.: 396,188

[22] Filed: Feb. 24, 1995

[51] Int. Cl.$^6$ ...................................................... F16J 15/08
[52] U.S. Cl. ................. 277/235 B; 277/236; 277/DIG. 6
[58] Field of Search ............................... 277/235 B, 236, 277/DIG. 6; 29/888.3

[56] References Cited

U.S. PATENT DOCUMENTS

| 3,473,813 | 10/1969 | Meyers et al. | 277/235 B |
| 4,796,897 | 1/1989 | Inciong | 277/235 B |
| 4,817,969 | 4/1989 | McDowell et al. | 29/888.3 |
| 5,076,592 | 12/1991 | Pearlstein | 277/180 |
| 5,106,107 | 4/1992 | Justus et al. | 277/235 B |
| 5,169,163 | 12/1992 | Udagawa et al. | 277/236 |
| 5,201,534 | 4/1993 | Miyaoh | 277/235 B |
| 5,275,139 | 1/1994 | Rosenquist | 277/235 B |
| 5,310,197 | 5/1994 | Bruch et al. | 277/235 |
| 5,316,321 | 5/1994 | Ishida et al. | 277/236 |
| 5,340,126 | 8/1994 | Antonini et al. | 277/235 B |

FOREIGN PATENT DOCUMENTS

| 3001599 | 7/1981 | Germany | 277/235 B |
| 866256 | 9/1981 | U.S.S.R. | 277/235 B |

OTHER PUBLICATIONS

Berylco Beryllium Nickel 440 Alloy Strip, Bulletin 306 2-PD1, by Cabot Berylco, pp. 4, 6 and 10.
ASTM Standard Specification for Copper–Nickel–Tin Spinodal Alloy Strip, May 1985, pp. 1061–1066.
Metals Handbook, Ninth Edition, vol. 4, Heat Treating, by American Society for Metals, pp. 736–737.
Manufacturing Processes and Materials for Engineers, by Lawrence E. Doyle, 1961, p. 121.
Mark's Standard Handbook for Mechanical Engineers, Eighth Edition 1978, pp. 6–63—6–65.
Machinery's Handbook, 22nd Edition 1985, pp. 2266–2267.
McGraw-Hill Concise Encyclopedia of Science & Technology, Second Edition 1989,230–232.
Hawley's Condensed Chemical Dictionary, Twelfth Edition 1993, pp. 139–141.

Primary Examiner—William A. Cuchlinski, Jr.
Assistant Examiner—John L. Beres
Attorney, Agent, or Firm—Rader, Fishman & Grauer

[57] ABSTRACT

An annular fire ring comprises an alloy of beryllium copper. Before the alloy is subject to precipitation hardening at elevated temperatures, the ring is placed at an inner periphery of a high temperature opening of a gasket body, wherein the diameter of the ring is greater than a thickness of the gasket body. The resulting gasket is then disposed between cooperating mechanical components. The mechanical components are clamped together, plastically deforming the fire ring. Then the ring is heated, causing precipitation hardening of the alloy.

19 Claims, 1 Drawing Sheet

DEFORMABLE COMBUSTION SEAL RING

FIELD OF THE INVENTION

The present invention relates to a gasket and more particularly to high temperature gasket having a deformable combustion seal fire ring.

BACKGROUND OF THE INVENTION

High temperature resistant gaskets are used to provide a seal against combustion gases at elevated temperatures. Such gaskets include cylinder head gaskets, exhaust manifold gaskets and turbocharger gaskets. In particular, cylinder head gaskets typically extend around cylinder bores to provide a combustion seal, maintaining the high temperature gases of combustion within the cylinder bore. The gasket bears the load from a bolted connection of the engine block and cylinder head components and relies upon that load to provide a seal.

It is known to provide cylinder head gaskets with a single flange positioned adjacent a cylinder bore opening formed in a body of the gasket. The flange is generally U-shaped in cross-section, having a central web portion separating upper and lower legs that extend continuously around the inner peripheral boundary of the cylinder bore opening and engage upper and lower surfaces of the gasket body.

Typically, an annular sealing element, such as a steel fire ring, having a generally circular cross-section is disposed within a trough defined by the U-shaped cross-section of the flange. The fire ring forms a seal that helps protect the gasket body from the deleterious effects of the combustion environment. Metals used in a fire ring include 1008 low carbon steel and 304 stainless steel.

A portion of the clamping force resulting from the bolting of the mating components is applied to the fire ring. The force is concentrated at the point of contact, plastically deforming the ring's circumference to effectively seal out combustion gases. However, because of the plastic deformation, existing fire rings have low elastic recovery which affects the gasket in the area adjacent to the rings. Fire rings made from soft metals such as copper typically have even less elastic recovery than those rings made from steel because they are readily plastically deformed. However, soft metal fire rings do have excellent initial conformity. Further, known fire rings are subject to thermal crushing which produces additional plastic deformation that occurs at high temperature operation during the life of the fire rings. Thus, the limited elastic recovery of the fire rings is further reduced over time.

The disadvantages of known fire rings also affect the performance of the U-shaped flanges that often retain them. The flanges are made from malleable metals. The use of malleable metals promotes flange thinning at the interface of the flange element and the sealing element. The flanges are particularly susceptible to cracking in the central web portion between the upper and lower legs of the flange. The likelihood of flange failure is increased as the elastic recovery of the disposed fire ring is decreased.

A goal of the present invention is to provide an annular sealing member that is readily deformable during installation to conform to a desired shape. However, the same sealing member also includes excellent strength characteristics to avoid undesirable thermal crushing once installed.

SUMMARY OF THE INVENTION

The present invention relates to an annular fire ring for use at an inner periphery of a high temperature opening of a gasket body, the fire ring having the ability to readily deform to adopt a desired shape during installation, but then providing desired long-term strength after being precipitation hardened upon exposure to elevated temperatures. In a preferred embodiment, the fire ring comprises an alloy of beryllium copper. The alloy includes between one and three percent beryllium, approximately 0.35 percent nickel or 0.25 percent cobalt, with the balance being primarily copper.

Once the ring is formed, it may be necessary to anneal the ring to make sure that no metastable conditions exist. The formed ring is placed at the inner periphery of the high temperature opening of the gasket body. The diameter of the ring is greater than a longitudinal thickness of the gasket body, which is the thickness defined between an upper surface and a lower surface of the gasket body. The gasket is then disposed between cooperating mechanical components such as a head block and engine liner, and the mating components are bolted together. A portion of the clamping force plastically deforms the fire ring, allowing the fire ring to conform to the surfaces of the mating components while maximizing the longitudinal extent of the fire ring. Then the fire ring is heated, typically through normal gasket operation, resulting in precipitation hardening of the beryllium copper fire ring.

In contrast to the prior art, the fire ring has the advantages of soft metal rings for initial sealing and thickness maximization, while providing superior benefits over traditional hard metal rings in long term operation. The tensile strength of the precipitation hardened fire ring is greater than that of hard metal rings, allowing the inventive fire ring to withstand greater thermal loading without further plastic deformation. The yield strength and hoops strength is also greater than that of traditional hard metal rings. The fire ring has excellent elastic recovery with a low modulus of elasticity and optimized thickness. The fire ring also has desirable thermal expansion and thermal conductivity. Finally, the fire ring even has good corrosion and wear resistance.

In one embodiment, the fire ring has a main body and a tail. The fire ring positioned adjacent to the gasket body. In an alternative embodiment, a U-shaped flange is used to secure a ring without a tail to the gasket body. The fire ring takes a greater reversible share of the clamping load, decreasing the thinning of the flange and lessening the possibility that the flange will crack in operation.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF A PREFERRED EMBODIMENT

Figure 1:
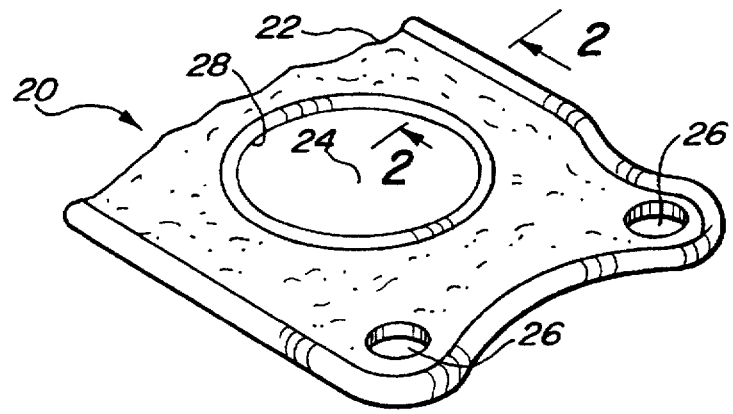
FIG. 1 is a perspective view of the inventive annular fire ring received in a combustion bore opening of a cylinder gasket of an internal combustion engine.

An engine cylinder head gasket 20 illustrated in FIG. 1 includes a gasket body 22, a high temperature combustion bore opening 24, and fastener openings 26. A preferred material for gasket body 22 includes a Victor 35119 graphite material, as manufactured by Dana Corporation. To provide a multiple sealing system about bore opening 24, gasket 20 includes an annular sealing element such as a fire ring 28 at an inner periphery of high temperature bore opening 24.

Figure 2:
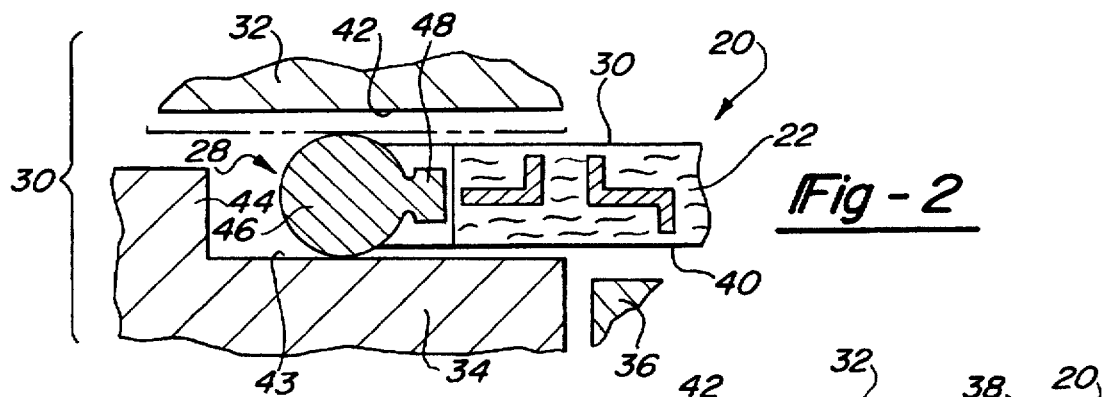
FIG. 2 is a cross-sectional view of the gasket of FIG. 1, taken along lines 2—2 showing the fire ring in an undeformed state between cooperating engine components.

A cylinder gasket assembly 30 is shown in FIG. 2. Gasket 20, including fire ring 28, is disposed between cooperating mechanical components 32 and 34 of an internal combustion engine. In the illustrated embodiment, components of a diesel engine are illustrated, with gasket 20 positioned between a head block, shown as component 32, and an engine liner, shown as component 34. A portion of an engine block or deck plate 36 is shown adjacent to engine liner 34. Gasket body 22 has a longitudinal thickness defined between an upper surface 38 and a lower surface 40. Upper surface 38 is adapted to contact a lower face 42 of block 32 while lower surface 40 is adapted to contact an upper face 43 of liner 34. Liner 34 also includes a longitudinally extending wall 44 having a longitudinal extent less than that of gasket body 22. Wall 44 is optional, but if present, helps to protect gasket 20 from the deleterious effects of the combustion environment.

Primary protection to gasket body 22 is provided by fire ring 28. As illustrated in FIG. 2, fire ring 28 includes a main body 46 and a laterally extending tail 48. Tail 48 provides additional radial strength to fire ring 28. While a circular cross-section is illustrated for main body 46, a variety of other cross-sectional shapes is also possible.

Unlike known prior fire rings which are typically steel, such as 1008 low carbon steel or 304 stainless steel, fire ring 28 has the ability to readily deform to adopt a desired shape during installation, but then provide desired long-term strength after being precipitation hardened upon exposure to elevated temperatures. In a preferred embodiment, fire ring 28 comprises an alloy of beryllium copper (BeCu). The formed alloy generally comprises between 96 and 98 percent (96–98%) copper (Cu), between 1 and 3 percent (1–3%) beryllium (Be), and trace amounts either cobalt (Co) or nickel (Ni). A typical alloy contains two (2%) percent beryllium, 0.25 percent cobalt or 0.35 percent nickel, with the balance comprising primarily copper. It is also possible for the alloy to include other elements, including between 0.9 and 1.10 percent silver (Ag). Another possible alloy for fire ring 28 is a beryllium nickel (BeCu) such as Berylco® berylium nickel alloys 440 (Ni-1.9Be-0.5Ti), 41C (Ni-2.75Be-0.5Cr), 42C (Ni-12Cr-2.75Be) and 43C (ni-6Cr-2.75Be). Yet another possible alloy is a copper nickel tin (BeNiSn) comprising between 77 and 85 percent (77–85%) copper (Cu), 9 and 15 percent (9–15%) nickel (Ni) and between 6 and 8 percent (6–8%) Sn.

In FIG. 2, fire ring 28 is shown in an undeformed state with the ring formed from an annealed mixture of the beryllium copper alloy. If necessary, the undeformed fire ring should be annealed to assure the absence of dislocations, vacancies, and other metastable conditions. Main body 46 has a diameter greater than the longitudinal thickness of gasket body 22.

Figure 3:
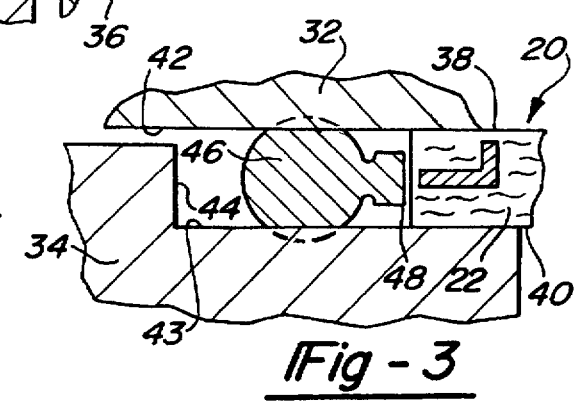
FIG. 3 is a cross-sectional view of the gasket after the cooperating engine components have been clamped together, showing the fire ring in a deformed state.

Before subjecting the fire ring to elevated temperatures, assembly 30 is clamped as shown in FIG. 3. Gasket 20, including fire ring 28, bears the load from the bolted connection of the engine components 32 and 34. Because copper is the main constituent of the annealed alloy, main body 46 readily plastically deforms as shown in FIG. 3 to form a generally elliptical shape with the major dimension extending in a lateral direction and the minor dimension extending in a longitudinal direction. The minor dimension is sized to conform to block 32 and liner 34 while maximizing the longitudinal thickness of the fire ring 28 in the final assembled orientation. Thus, fire ring 28 provides an excellent initial combustion seal between block 32 and liner 34. Elastic recovery is essential to fire ring 28 so that the ring may adjust for dimensional variations occurring between block 32 and liner 34 during engine operation.

Figure 4:
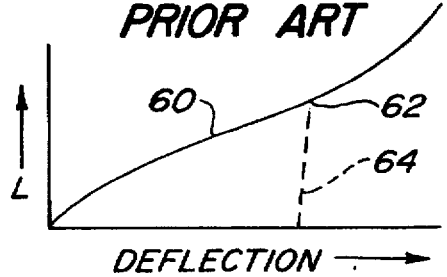
FIG. 4 is a load versus deflection curve for prior art fire rings.

A typical load deflection curve 60 is illustrated in FIG. 4 for known hard metal fire rings with applied load plotted versus deflection of the fire ring metal. For a given load and deflection illustrated at point 62, the degree of elastic recovery is shown by dotted line 64. However, even traditional hard metal rings are subject to thermal crushing which produces additional plastic deformation that occurs at high temperature operation during the life of such rings. Thus, the limited elastic recovery of traditional hard metal rings is further reduced over time.

Figure 5:
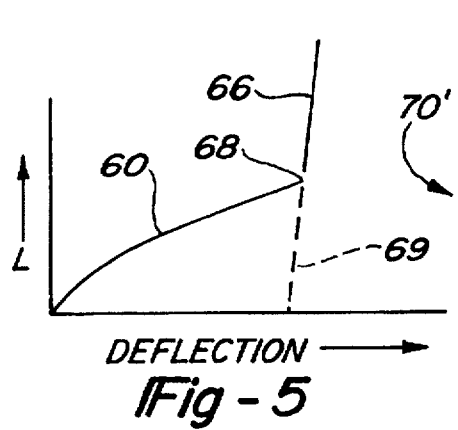
FIG. 5 is a load versus deflection curve for the inventive fire ring.

In contrast to the prior art, fire ring 28 has the advantages of soft metal rings for initial sealing and thickness maximization, while providing superior benefits over traditional hard metal fire rings in long term operation. Once fire ring 28 is positioned as shown in FIG. 3, it is subjected to elevated temperatures to promote precipitation hardening of the beryllium copper alloy. A load/deflection curve 66 is shown in FIG. 5 for fire ring 28 with applied load plotted versus fire ring metal deflection. When the alloy is heated at point 68, the load deflection curve becomes almost vertical. In practice, the precipitation hardening typically takes place after installation and during initial exposure to high temperature operation by fire ring 28 of gasket 20. For example, when gasket 20 is used in an engine, the ring undergoes its transformation after a short exposure to normal operating temperatures of approximately 400° F. to 600 °F. (204° C. to 316° C.) for between one-half and four hours. The time required for precipitation hardening depends in part on the degree of cold working through initial deformation of ring 28 during installation. The degree of elastic recovery is shown by dotted line 69.

Once precipitation hardened, fire ring 28 has a number of significant advantages over known annular sealing elements that help to prolong the life of gasket 20. For example, the tensile strength of fire ring 28 increases by a factor of between two and three, thereby allowing the fire ring to withstand greater thermal loading, without further plastic deformation, over known fire rings. The yield strength is three to four times greater than that of steel fire rings. The fire ring has better hoop strength. Further, the elastic recovery of fire ring 28 is at least twice the elastic recovery of existing low carbon steel fire rings at the same loading because of its lower modulus of elasticity, greater strength, and optimized thickness. The presence of copper provides fire ring 28 with a substantially greater thermal expansion and higher thermal conductivity. As a result, fire ring 28 has a lower operating temperature. Fire ring 28 even has good corrosion and wear resistance. Table 1 lists various properties of two typical fire ring steels, an annealed beryllium copper, and a precipitation hardened beryllium copper:

TABLE 1

|  | 1008 Low Carbon Steel | 304 Stainless Steel | Annealed Beryllium Copper | Precipitation Hardened Beryllium Copper |
| --- | --- | --- | --- | --- |
| Modulus of Elasticity PSI × $10^6$ | 30.0 | 28.0 | 18.5 | 18.5 |
| Poissons Ratio | 0.30 | 0.30 | 0.31 | 0.31 |
| Yield Strength PSI | 33,000 | 40,000 | 25,000 | 145,000 |
| Tensile Strength PSI | 60,000 | 110,000 | 75,000 | 180,000 |
| Thermal Expansion °C. | 11.7 | 9.9 | 17.5 | 17.5 |
| Thermal Conductivity cal/s/cm2/cm/°C. | 0.107 | 0.045 | 0.245 | 0.245 |

Figure 6:
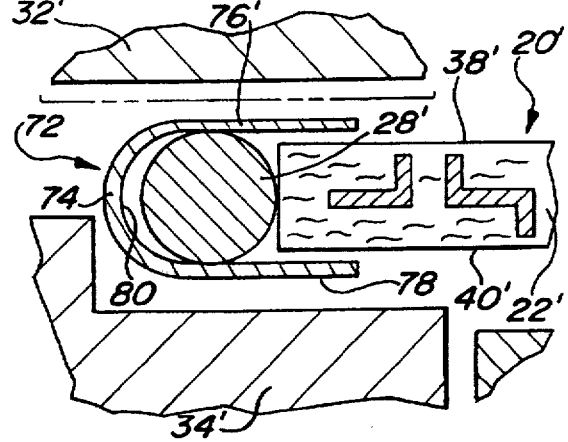
FIG. 6 is a cross-sectional view of an alternative embodiment of the present invention, wherein a U-shaped flange secures the fire ring to the gasket.

An alternative embodiment of the present invention is shown in FIG. 6, illustrating an assembly 70. Like elements have the same reference numbers as in the embodiment of FIGS. 1–3. Assembly 70 includes a gasket 20' disposed between a head block 32' and an engine liner 34'. Gasket 20' comprises a gasket body 22', a fire ring 28', and an annular flange 72 having a generally U-shaped cross-section. Flange 72 includes a central web portion 74 separating upper and lower legs 76 and 78 that extend continuously around the inner peripheral boundary of cylinder bore opening 24 and engage upper and lower surfaces 38' and 40' of gasket body 22'. Fire ring 28' is disposed within a trough 80 defined by the U-shaped cross-section of the flange and is secured to gasket body 22' using flange 72. Fire ring 28' comprises only a central body 46'. Otherwise, fire ring 28' is identical to fire ring 28.

Gasket 20' is shown in FIG. 6 before block 32 is clamped to liner 34. During clamping, both flange 72 and fire ring 28' are deformed. Flange 72 is made from a malleable metal. Therefore, there is the likelihood of flange thinning at the interface of the flange and fire ring. Further, flange 72 is particularly susceptible to cracking in the central web 74 portion between the upper and lower legs 76 and 78.

The use of beryllium copper for fire ring 28' decreases the likelihood of the failure of flange 72. As discussed above, a beryllium copper fire ring subjected to precipitation hardening has number of advantages over known prior art fire rings. These advantages include a greater longitudinal thickness, increased elastic recovery, greater thermal expansion, high thermal conductivity, and improved wear resistance. Therefore, fire ring 28' takes a greater reversible share of the clamping load when compared to prior art fire rings. Thus, the thinning of flange 72 is decreased, and there is less susceptibility to cracking in the central web portion 74.

Preferred embodiments of the present invention have been disclosed. A person of ordinary skill in the art would realize, however that certain modifications would come within the teachings of this invention. Therefore, the following claims should be studied to determine the true scope and content of the invention.

What is claimed is:

1. An annular fire ring for use at an inner periphery of a high temperature opening of a high temperature resistant gasket body, said body defining a thickness, wherein said ring having a first hardness is deformed in an annealed condition from an initial relaxed shape having a longitudinal cross-section greater than said thickness of said gasket body to a desirable operational configuration with a minor dimension generally corresponding to said thickness of said gasket, said ring precipitation hardened to a second hardness greater than said first hardness when in said operational configuration, wherein said second hardness is between two and three times higher than said first hardness.

2. An annular fire ring as recited in claim 1, wherein said initial shape of said ring includes a generally circular cross-section.

3. An annular fire ring as recited in claim 1, wherein said ring comprises an alloy of copper and between approximately 1 and 3 percent beryllium.

4. An annular fire ring as recited in claim 3, wherein said alloy comprises at least one of nickel and cobalt.

5. An annular fire ring as recited in claim 4, wherein said ring comprises approximately 0.35 percent nickel.

6. An annular fire ring as recited in claim 4, wherein said ring comprises approximately 0.25 percent cobalt.

7. A method of making an annular fire ring, comprising the steps of:

forming an annealed alloy with a first hardness that may be precipitation hardened at elevated temperatures to a second hardness between two and three times harder than said first hardness;

making said annular ring;

deforming plastically said ring to a final configuration; and heating said ring to increase material strength of said alloy through precipitation hardening from said first hardness to said second hardness.

8. A method as recited in claim 7, wherein said alloy comprises copper and beryllium.

9. A method as recited in claim 8, wherein said alloy comprises between 1 and 3 percent beryllium.

10. A method as recited in claim 7, wherein said heating step comprises heating said ring to between 400° F. and 600° F. for approximately one-half to four hours.

11. A method as recited in claim 7, comprising the step of placing said ring at an inner periphery of a high temperature opening of a high temperature resistant gasket body before said deforming step.

12. A method as recited in claim 11, wherein said making step results in a cross-section of said ring being greater than a corresponding thickness of said gasket body.

13. A method as recited in claim 12, wherein said ring has a generally circular cross-section.

14. A method as recited in claim 7, further comprising an annealing step after said forming step and before said deforming step.

15. A method of making and using an annular fire ring for use in a high temperature environment, comprising the steps of:

forming an alloy comprising copper and between one and three percent beryllium;

making said annular ring;

placing said ring at an inner periphery of a high temperature opening of a high temperature resistant gasket body, wherein a cross-section of said ring is greater than a corresponding thickness of said gasket body, said thickness defined between an upper surface and a lower surface of said gasket body;

disposing said ring and gasket between cooperating mechanical components;

clamping said mechanical components and deforming plastically said ring to a final configuration; and heating said ring from a first hardness by means of a high temperature environment to increase material strength of said alloy through precipitation hardening to a second hardness between two and three times higher than said first hardness.

16. A method as recited in claim 15, wherein said cross-section is generally circular.

17. A method as recited in claim 15, wherein said heating seep comprises heating said ring to between 400° F. and 600° F. for approximately 0.50 to four hours.

18. A method as recited in claim 15, further comprising an annealing step after said forming step and before said deforming step.

19. A method as recited in claim 15, comprising the step of securing said ring to said gasket using a generally U-shaped flange, said ring received in a trough defined between upper and lower legs of said flange, and said legs engaging said upper and lower surfaces of said gasket.

* * * * *

UNITED STATES PATENT AND TRADEMARK OFFICE
CERTIFICATE OF CORRECTION

PATENT NO. : 5,636,850
DATED : June 10, 1997
INVENTOR(S) : Jerry E. Kashmerick

It is certified that error appears in the above-indentified patent and that said Letters Patent is hereby corrected as shown below:

In column 8, line 11, change "seep" to "step".

Signed and Sealed this

Twenty-third Day of September, 1997

Attest:

BRUCE LEHMAN

*Attesting Officer*   *Commissioner of Patents and Trademarks*